United States Patent [19]

Kern

[11] Patent Number: 4,762,974

[45] Date of Patent: Aug. 9, 1988

[54] ELECTRICALLY INDEPENDENT WIRE ELECTROEROSION DISCHARGE MACHINE

[76] Inventor: Harry Kern, 82 Aspen Dr. W., Woodbury, N.Y. 11797

[21] Appl. No.: 4,647

[22] Filed: Jan. 20, 1987

[51] Int. Cl.⁴ .............................................. B23H 7/10
[52] U.S. Cl. ................................................. 219/69 W
[58] Field of Search ......................... 219/69 W, 69 M; 204/206, 224 M

[56] References Cited

U.S. PATENT DOCUMENTS

| | | | |
|---|---|---|---|
| 4,243,864 | 1/1981 | Vieau et al. | 219/69 W |
| 4,475,996 | 10/1984 | Inoue | 219/69 W |
| 4,559,434 | 12/1985 | Kinoshita | 219/69 C |
| 4,686,344 | 8/1987 | Nakayama | 219/69 W |

FOREIGN PATENT DOCUMENTS

| | | | |
|---|---|---|---|
| 2900557 | 7/1979 | Fed. Rep. of Germany | 219/69 W |
| 54-6186 | 1/1979 | Japan | 219/69 W |
| 59-42224 | 3/1984 | Japan | 219/69 M |
| 191725 | 9/1985 | Japan | 219/69 W |
| 61-30325 | 2/1986 | Japan | 219/69 W |
| 1525712 | 9/1978 | United Kingdom | 219/69 W |

Primary Examiner—A. D. Pellinen
Assistant Examiner—Geoffrey S. Evans
Attorney, Agent, or Firm—Michael I. Kroll

[57] ABSTRACT

An electroerosion discharge machine with multiple lead power supply is provided, which has a multiple wire electrode feed in which all of the wire electrodes are electrically insulated from one another. By insulating the wire electrodes from each other throughout the device, differing currents and other differing parameters such as tension can be applied to each wire so that the most appropriate condition may be used to erode a given workpiece made out of a particular material. The present invention also permits workpieces of varying heights to be simultaneously cut as well as allowing the various sized wire electrodes to erode the workpiece at a wire speed that is most appropriate for the given task at hand, as well as other important parameters which can be selected independently for each wire.

7 Claims, 2 Drawing Sheets

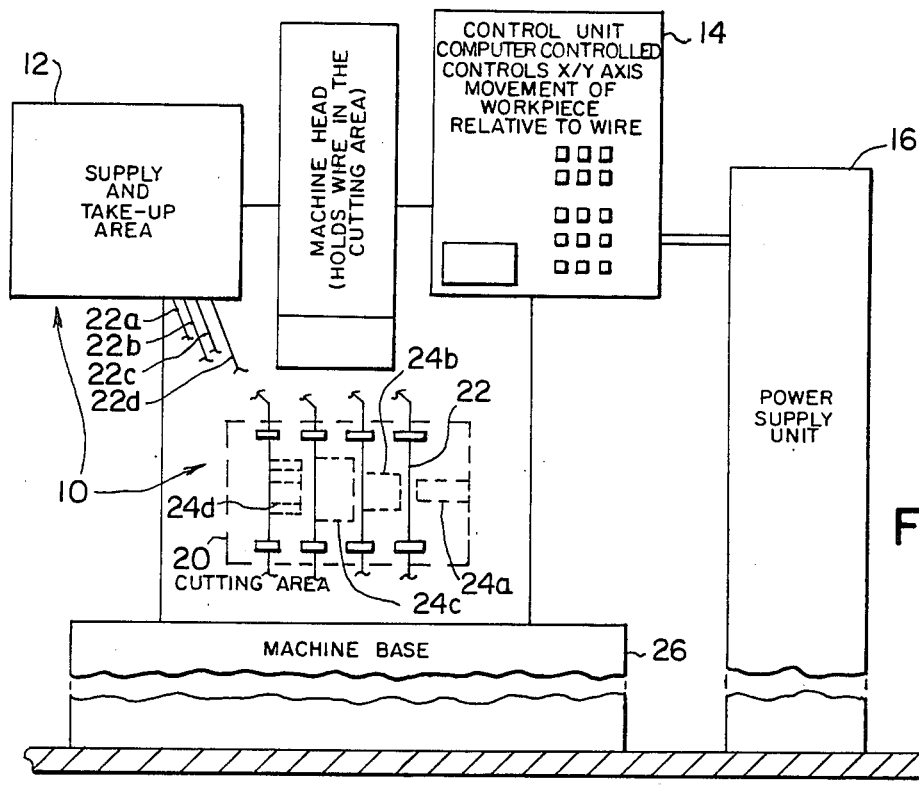
Figure 1
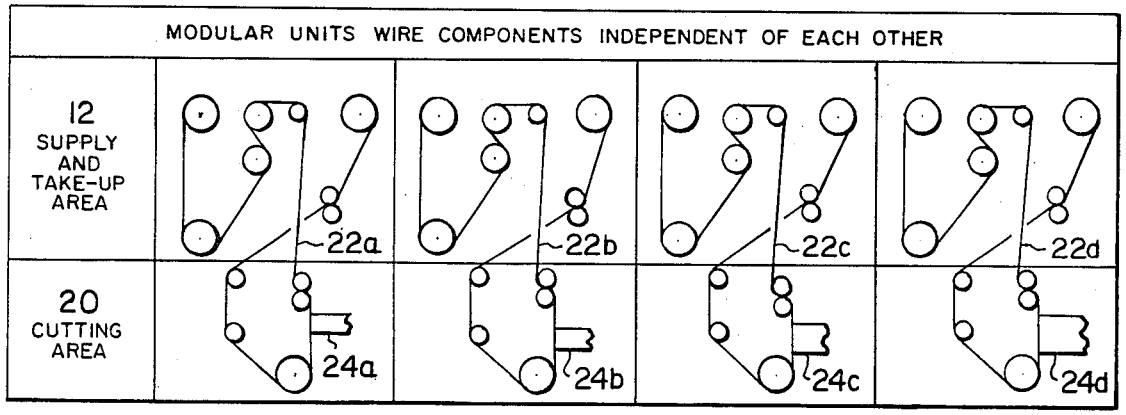
Figure 2
| | SET OF TOOLING PARTS SIMULTANIOUSLY CUT TOTAL NUMBER OF WIRES USED WILL VARY ACCORDING TO APPLICATION | | | | | |
|---|---|---|---|---|---|---|
| WIRE NUMBER | WIRE SIZE (INCHES) | SPEED OF WIRE | POWER (AMPERES) | WORKPIECE TYPE OF MATERIAL | WORKPIECE THICKNESS (INCHES) | DESCRIPTION OF WORKPIECE (TOOLING PART) |
| 1 | 0.008 | LOW | 5 | ALUMINUM | 0.125 | TEMPLATE |
| 2 | 0.012 | HIGH | 30 | CARBON STEEL | 1.500 | PUNCH |
| 3 | 0.010 | MEDIUM | 20 | CARBIDE | 0.500 | DIE |
| 4 | 0.010 | MEDIUM | 15 | CARBON STEEL | 0.750 | DIE BACK-UP PLATE |
Figure 3

ELECTRICALLY INDEPENDENT WIRE ELECTROEROSION DISCHARGE MACHINE

BACKGROUND OF THE INVENTION

1. Field of the Invention

The present invention relates generally to an improved electroerosion discharge machine ("EDM"). More particularly, this invention utilizes several wires, which are electrically insulated from one another and may be electrically charged with varying parameters to permit the electroerosion of several workpieces, made of different substances and thickness, simultaneously.

2. Description of the Prior Art

The concept of electrical discharge machining is a process using nonstationary, time-spaced electrical discharges between an electrode and a workpiece for the removal of material. By employing electrical discharge machining, it is possible to cut, or otherwise mode, intricate shapes into all conductive materials with an extremely high level of precision.

Standard EDM equipment has been used in industry for over three decades and generally employs a graphite contoured, or similar electrode to penetrate the desired workpieces. By providing a voltage between the electrode and workpiece and a servo system to control the gap, sparks are induced in the gap which results in vaporizing the workpiece and eventually creating a shape which is the inverse image of the electrode.

The prior art also includes the concept of wire EDM. This form of electrical discharge machining involves use of an electrode that is a continuously moving, expendable wire which conducts electricity to the workpiece without actually touching the workpiece. The wire is generally made of either copper, brass, molybdenum or tungsten having usually a diameter of 0.002 inches to 0.012 inches. The diameter of the wire may be reduced as it is used to erode the workpiece. Accordingly, the wire is often discharged as scrap once it has served its function in the EDM process.

To prevent short circuits between the workpiece and the electrode and to cool the wire, a dielectric fluid, e.g., de-ionized water, or other dielectric is employed to flush away the condensed material (debris).

Prior art devices have recognized that by varying the diameter of the wire used, the speed with which the wire erodes the workpiece by passing near it, the current passing through the wire and proper choice of polarity, different workpieces made out of various materials and having varying thicknesses may be accurately cut and shaped.

Wire EDM devices heretofore known have generally employed a single wire electrode to electrically erode a single workpiece. More recently, devices have become known which employ multiple wire electrodes to simultaneously erode with identical voltage, current and polarity. One such device is disclosed in U.S. Pat. No. 4,243,864, issued to Vieau et. al., on Jan. 6, 1981. Specifically, the device of the foregoing patent provides a plurality of supply spools of electrically conductive wire. Each of the spools provides a wire to a tension assembly from which the wire is delivered to a cutting guide assembly. The cutting guide assembly holds the wires parallel to each other so that identical workpieces receive multiple cuts simultaneously. In the prior art device, the used wires are then taken up by a take-up assembly. At the take-up assembly, the wires are wound onto a single take-up spool, providing the same electrical potential to all wires.

A major drawback in the prior art device disclosed in U.S. Pat. No. 4,243,864, as well as in other devices known to the art is the inability of a multiple wire electrode EDM device to simultaneously erode various workpieces made of different materials and different thicknesses said drawbacks being overcome by the present invention as more fully described hereinafter.

SUMMARY OF THE INVENTION

An object of the present invention is to provide a wire electroerosion apparatus that is capable of simultaneously eroding various workpieces of different materials.

A further object of the invention is to provide a wire electroerosion apparatus that is more compact than prior art devices so that valuable factory space may be conserved.

A still further object of the present invention is to provide a wire electroerosion apparatus capable of simultaneously eroding various workpieces of different thicknesses.

Another object of the present invention is to provide a wire electroerosion apparatus that is both simple and safe to operate.

An additional object of the invention is to provide a wire electroerosion apparatus that overcomes the shortcomings inherent in the prior art devices.

The foregoing and related objects are accomplished by an electrically independent electroerosion discharge apparatus having a multiple wire electrode feed in which all of the wire electrodes are electrically insulated from one another. By insulating the wire electrodes from each other throughout the device, differing currents can be applied to each wire so that the most appropriate current may be used to erode a given workpiece made out of a particular material. The present invention also permits workpieces of varying heights to be simultaneously cut as well as allowing the various wire electrodes to erode the workpiece at a wire speed that is most appropriate for the given task at hand.

Other objects and features of the present invention will be apparent to the skilled art worker. To the accomplishment of the above and related objects, this invention may be embodied in the form illustrated in the accompanying drawings, attention being called to the fact, however, that the drawings are illustrative only, and that changes may be made in the specific construction and design illustrated and described within the scope of the appended claims.

In summary, since each wire is electrically insulated from one another and can be charged from a discrete electrical source, each wire can have its own independent:

a. negative or positive charge;
b. voltage level;
c. cutting power (amperage);
d. diameter;
e. material;
f. tension;
g. supply spool;
h. take-up spool; and
i. speed.

BRIEF DESCRIPTION OF THE DRAWINGS

FIG. 1 is a schematic diagram of the various components of the electrically independent electroerosion discharge apparatus of the present invention, mounted on an EDM machine.

FIG. 2 is a schematic diagram of the wire components of the present invention independent of each other shown as modular units;

FIG. 3 is a table providing an illustrative example of how the electroerosion discharge apparatus of the present invention could operate;

DETAILED DESCRIPTION OF THE PREFERRED EMBODIMENTS

Figures 4A, 4B, 4C:
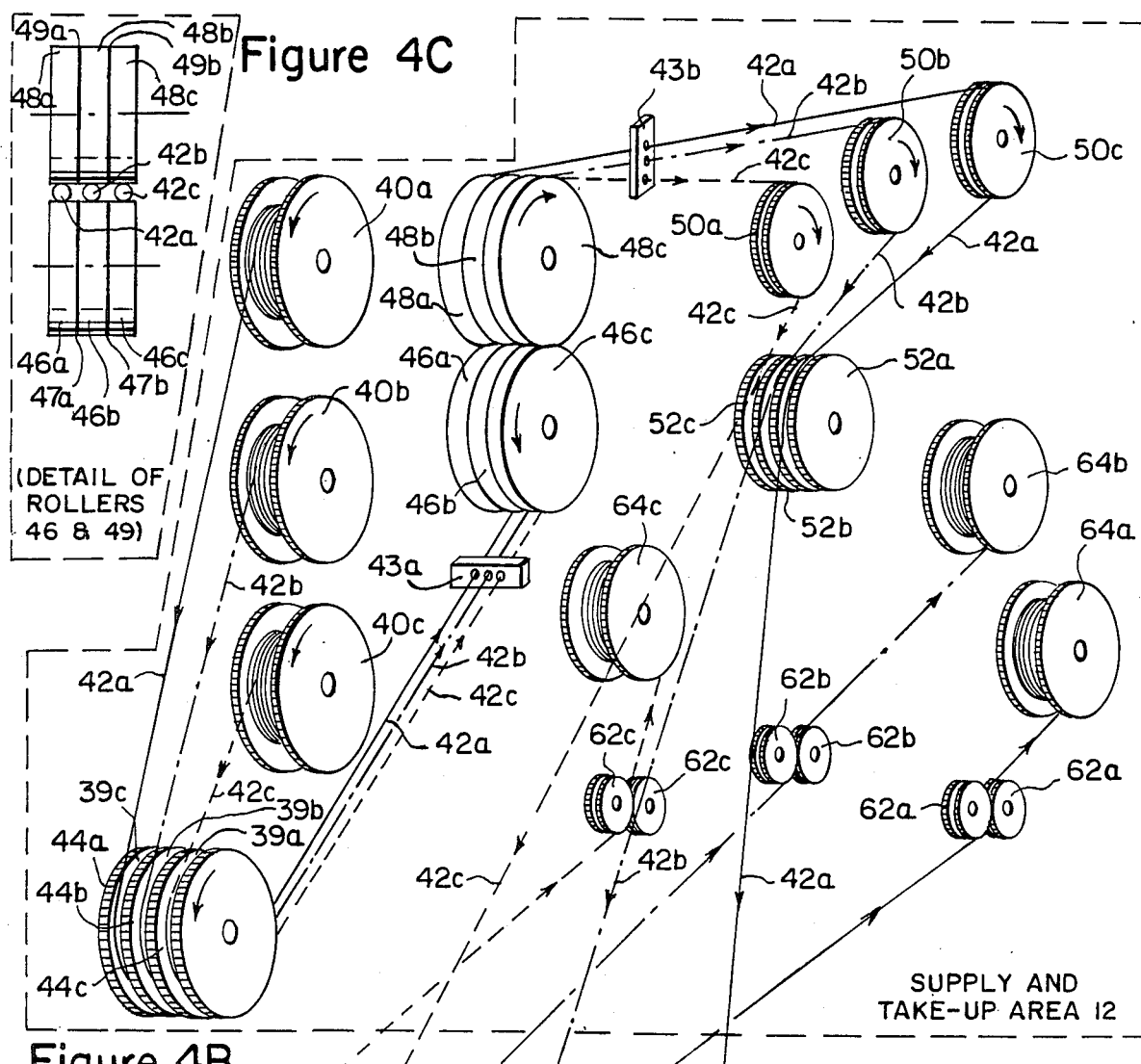
FIG. 4A is a detailed perspective view of the cutting area of the inventive electroerosion discharge apparatus of FIG. 1.
FIG. 4B is a detailed perspective view of the supply and take-up area of the inventive electroerosion discharge apparatus of FIG. 1.
FIG. 4C is a cross-sectional view of a set of insulated independent rollers employed in the supply and take-up area of the present invention.

Turning now in detail to a description of the drawings, FIG. 1 illustrates the preferred design of an electrically independent wire electroerosion discharge apparatus encompassing the present invention. The electrically independent multiple wire EDM device 10 shown in FIG. 1 comprises a supply and take-up area 12 for electroerosion wires 22; a cutting area 20; a machine head 15 for holding wires 22 in cutting area 20; a computerized control unit for holding wires 22 a controlled distance from the desired workpieces 24 as well as for controlling the speed and tension of wires 22 as they erode workpieces 24, and for controlling the X/Y axis movement of workpieces 24 relative to wires 22; and, a suitable multi-lead power supply unit 16 for supplying the necessary current through wires 22. The wires 22 may be made of copper, brass or tungsten, or other material conventionally used for such wires in EDM devices. Wire EDM 10 is often suitably mounted on a machine base 26. As shown in FIG. 1, the multiple wire EDM 10 is provided with four erosion wires, 22a, 22b, 22c, 22d, each insulated from one another. Accordingly, EDM 10 is capable of simultaneously eroding four workpieces 24a, 24b, 24c, 24d. The feeding of a suitable dielectric fluid, e.g., water, is accomplished by submerging workpieces 24 into the dielectric fluid or by flushing the fluid onto the workpieces 24. It should be stressed, of course, that the present invention may be modified by the skilled art worker to include any plurality of cutting wires. The drawings are only illustrative and not a definition of the scope of the invention.

FIG. 2 is a schematic diagram emphasizing the fact that electroerosion wires 22 should be sufficiently insulated from one another for proper operation of EDM 10. With respect to each wire 22, the wire is fed from a supply spool in supply and take-up area 12 to cutting area 20 and past workpiece 24. Following erosion of workpiece 24, wire 22 is returned to the supply and take-up area to be collected on a separate take-up spool each. The speed and tension of wires 22, as well as the current passing through each of the wires may be independently set and varied according to the requirements of a particular task, e.g., varied according to the workpiece being eroded.

The capabilities of the present invention are illustrated in FIG. 3. FIG. 3 describes how the electrically independent wire EDM device 10 may simultaneously erode workpieces of vastly different thickness, which may be made of aluminum, carbon steel or carbide, with significantly different currents and wire speeds.

FIGS. 4a, 4b, and 4c depict in detail a preferred embodiment of the mechanics of supply and take-up area 12 and cutting area 20 of EDM 10. For purposes of illustration only FIGS. 4a, 4b and 4c are shown having three electroerosion wires 42a, 42b and 42c rather than four wires as referred to in the first three figures. Clearly, the invention encompasses use of any plurality of wires.

Referring, initially, to FIG. 4B, each electroerosion wire 42a, 42b, 42c is supplied to the electroerosion process from an insulated individual supply spool 40a, 40b, 40c, respectively. From each supply spool, each wire is led to an independent insulated idle roller 44a, 44b, 44c with each roller having an insulated groove 39a, 39b, 39c, so that electroerosion wires 42 are capable of simultaneously carrying different currents. Proceeding from rollers 44, wires 42 are led through a series of rollers 46 and 48. Rollers 46a, 46b, 46c should be insulated from one another and be capable of operating independently of one another so that wires 42a, 42b, 42c, respectively, may proceed through the electroerosion process at varying speeds simultaneously. In FIG. 4B, between independent idle rollers 44 and independent variable speed feed rollers 46 is an insulated wire guide 43a.

A wire guide, such as 43a, may be placed at various points throughout the electroerosion discharge device of the present invention in order to insure that the plurality of independent wires in the device properly proceed through the device and, importantly, to insure that electroerosion wires carrying different currents do not contact one another. Placement of such wire guides will depend upon the dimensions of the particular machine, the actual number and dimensions of the rollers employed, etc. The wire guides are to be made from any material that may suitably insulate the electroerosion wires from one another.

Following wires 42 through supply and take-up area 12, from rollers 46, wires 42 proceed to insulated independent idle pressure rollers 48. FIG. 4C shows a cross-sectional view of the relationship between rollers 46 and 48 with wires 42. From this view, the necessary use of insulation between the wires can be best seen. Such insulation is designated 47a, 47b for rollers 46, and 49a, 49b for rollers 48. It is important for proper operation of EDM device 10 that the plurality of electroerosion wires be sufficiently insulated from one another at all points in the device.

As may be noted from FIG. 4B, the independent rollers of 44, 46 and 48 are all, preferably, aligned parallel to one another. From rollers 48a, 48b, 48c, wires 42a, 42b, 42c each proceed through wire guide 43b to an individual (non-parallel) insulated wire tension roller 50a, 50b, 50c, respectively, and from there are led to independent insulated idle rollers 52a, 52b, 52c, respectively. Rollers 52 are, preferably, parallel to one another. From rollers 52, wires 22, leave supply and take-up area 12 and enter cutting area 20, shown in detail in FIG. 4A.

Cutting area 20 comprises a pair of insulated idle rollers 54 for each electroerosion wire 42 for leading the wire past workpiece 58 which is held in place by conventional means. One pair of rollers 54 is provided for each electroerosion wire that the EDM is to have. In FIG. 4B, these rollers are designated 54a, 54b, 54c. A wire guide 56 is, preferably, situated between rollers 54 and workpiece 58 to insure a proper positioning of wires 42 during the electroerosion process. As wires 42 bypass their particular workpieces 58, they erode the workpieces in the manner conventionally known.

Following erosion of workpieces 58, wires 42a, 42b, 42c are led through wire guides 57a, 57b, 57c, respectively, and to a pair of insulated idle rollers 60a, 60b, 60c and, in turn, each wire 42 is led to an insulated idle roller designated by the reference numerals 61a, 61b, 61c. At this point in the EDM, wires 42a, 42b, 42c are led out of cutting area 20 (FIG. 4). Wires 42a, 42b and 42c first proceed through a pair of insulated power crush rollers 62a, 62b and 62c and then onto separate insulated power collection spools 64a, 64b and 64c, respectively, and by varying the speed of said independent power crush rollers the wire tension may be automatically individually regulated. Once collected on spool 64a, 64b and 64c the used wire is generally discarded.

As shown in FIGS. 4a and 4b, the workpieces may vary in material type and thickness and as indicated by workpiece 58c, several workpieces may be stacked and eroded by a single wire 42c.

While certain novel features of the present invention have been shown and described and are pointed out in the annexed claims, it will be understood that various omissions, substitutions and changes in the forms and details illustrated and in its operation can be made by those skilled in the art without departing from the spirit and scope of the invention.

What is claimed is:

1. An electrically independent multiple electroerosion apparatus comprising:
   a plurality of workpieces;
   a take-up and supply area for at least three supply spools and at least three take-up spools for at least three electrically conductive wires, each of said at least three wires being insulated from the remaining wires in said at least three wires so that differing currents can be simultaneously applied to said each of said at least three wires;
   a cutting area in which said at least three wires operate simultaneously each with a different tension and a different speed, said each of said at least three wires being capable of being passed a sufficiently close distance to each workpiece of said plurality of workpieces so that when said differing currents are simultaneously passed through said each of said at least three wires said plurality of workpieces are electrically eroded simultaneously to form different figured workpieces from different materials of different thicknesses;
   means for positioning and retaining said each of said at least three wires in said cutting area; and
   means for controlling said speed and said tension of said each of said at least three wires.

2. The electrically independent multiple wire electroerosion apparatus according to claim 1, wherein said take-up and supply area includes a series of rollers capable of simultaneously feeding said plurality of wires to said cutting area while insulating said plurality of wires from one another.

3. The electrically independent multiple electroerosion apparatus according to claim 1, wherein each of said plurality of said wires is simultaneously capable of moving through said supply and take-up area and said cutting area at different speeds.

4. The multiple electrically independent multiple wire electroerosion apparatus according to claim 1, wherein said at least three electrically conductive wires is four.

5. The multiple electrically independent multiple wire electroerosion apparatus according to claim 1, wherein said means for positioning and retaining each of said wires in said cutting area is a machine head.

6. The electrically independent multiple wire electroerosion apparatus according to claim 1, wherein said means for controlling the X/Y axis movement of said workpiece relative to a particular wire is a computerized control unit.

7. The electrically independent multiple wire electroerosion apparatus according to claim 1, wherein said means for controlling the speed and tension of each of said wires of said plurality of wires is a computerized control unit.

* * * * *